E. E. KRUMBEIN.
DIRIGIBLE HEADLIGHT.
APPLICATION FILED AUG. 5, 1916.
1,198,855.
Patented Sept. 19, 1916.
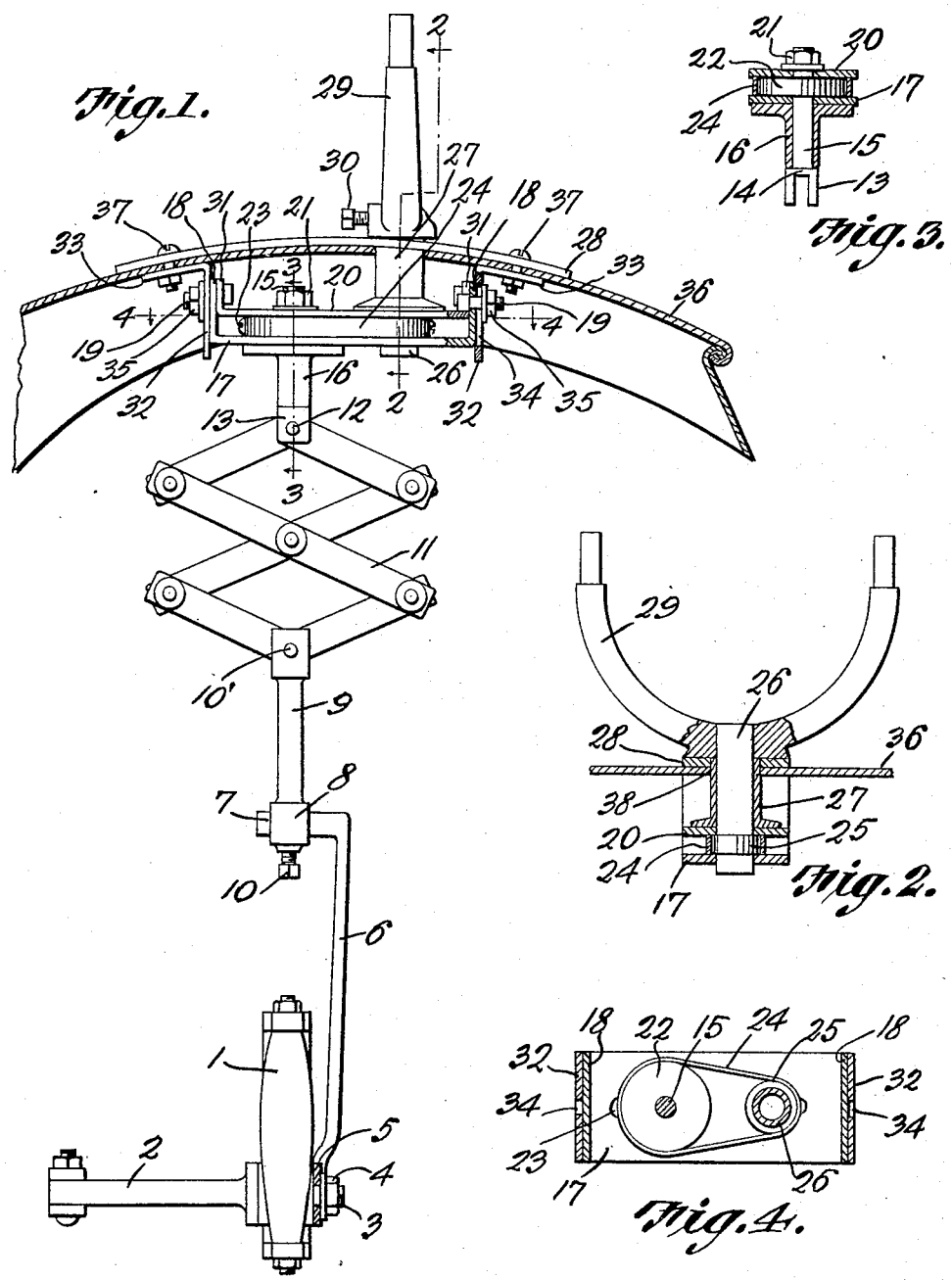
Witnesses
F. B. Wooden.
R. T. Parker
E. E. Krumbein, Inventor
by C. A. Snow & Co.,
Attorneys

UNITED STATES PATENT OFFICE.

ELMER E. KRUMBEIN, OF WOMELSDORF, PENNSYLVANIA.

DIRIGIBLE HEADLIGHT.

1,198,855.  Specification of Letters Patent.  Patented Sept. 19, 1916.

Application filed August 5, 1916. Serial No. 113,325.

*To all whom it may concern:*

Be it known that I, ELMER E. KRUMBEIN, a citizen of the United States, residing at Womelsdorf, in the county of Berks and State of Pennsylvania, have invented a new and useful Dirigible Headlight, of which the following is a specification.

This invention relates to dirigible headlights for automobiles and other vehicles and has for its object to provide means whereby the supported lamp can be connected directly to the spindle carrying member of the steering knuckle of an automobile so that, as the front wheels of a vehicle are turned to the right or to the left, a corresponding movement of the supported lamp will be effected.

A further object is to provide improved means whereby motion will be transmitted from the knuckle to the lamp irrespective of any up and down movement of the vehicle body relative to the axle.

A still further object is to provide mechanism of this character which will always operate to turn the lamp slightly faster than the wheel to which it is connected so that said lamp will be moved in advance of the vehicle when turning and thus illuminate that portion of the road into which the vehicle is to turn.

Another object is to provide mechanism of this character which can be applied readily to the mud guards of a vehicle, formed of but few parts, and will not readily get out of order.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a view partly in side elevation and partly in section of the mechanism constituting the present invention, a portion of a steering knuckle and of a mud guard being shown. Fig. 2 is a section through a portion of the apparatus on the line 2—2 of Fig. 1. Fig. 3 is a section on line 3—3 Fig. 1, the band engaging wheel and its spindle being shown in elevation. Fig. 4 is a section on line 4—4 Fig. 1.

Referring to the figures by characters of reference 1 designates the movable member of a steering knuckle such as found at each end of the front axle of a Ford automobile, this member being provided in some forms of machines, with an arm 2 having a threaded stem 3 extending through the knuckle member 1 and engaged by a fastening nut 4. This arm 2 is adapted to be attached to a cross rod forming a part of the steering mechanism and whereby the two front wheels of the automobile are caused to swing together. Where an arm 2 forms a part of the automobile structure, the nut 4 is removed and an eye 5 is placed over the projecting end of the stem 3 and is fastened in place by replacing the nut 4. This eye 5 is provided at the lower end of a rod 6 which extends upwardly and terminates in a rearwardly extending finger 7 which overhangs and intersects the axis of the knuckle. Finger 7 projects through an eye 8 provided at the lower end of an arm 9, there being a set screw 10 extending into the eye 8 for engaging the finger 7 to hold the arm 9 against movement relative to the finger. The upper end of the arm 9 is pivotally connected as at 10' to the lower end of a lazy tongs 11 and the upper end of the lazy tongs is pivotally connected as at 12 to the forked end 13 of a head 14 provided at the lower end of a stem 15. This stem is mounted for rotation within a bearing 16 extending downwardly from a plate 17 which has upturned ends 18 through which extend bolts 19. A top plate 20 is arranged above the plate 17 and the upper portion of the stem 15 extends through this top plate and is provided with a nut 21 as shown whereby downward withdrawal of the stem from the plate is prevented. A wheel 22 is secured to and rotates with the stem 15 and is located between the plates 17 and 20. Secured to this wheel by a screw 23 or the like is an endless band 24 preferably of metal and which extends partly around another smaller wheel 25 which is secured to and rotates with a stem 26 projecting downwardly through the plates 17 and 20. Stem 26 bears within an upstanding tubular bearing member 27 mounted on the plate 20 and which tubular bearing member projects into an arcuate attaching strip 28 on which rests the lamp engaging yoke 29 which is detachably secured to the stem 26 in any desired manner, as by means of a set screw 30.

The top plate 20 has upturned forked or slotted ends 31 which straddle the heads of the bolts 19 so as to hold the bolts against rotation. Engaging the outer faces of the upturned ends 18 are the longitudinal slotted depending portions 32 of attaching brackets 33. The bolts 19 extend into the slots 34 in the depending portions 32 of the brackets and are engaged by nuts 35 which, when tightened, bind the brackets to the upturned ends 18.

The attaching strip 28 is designed to rest upon a mud guard 36 and is held thereto by small bolts 37 extending downwardly through the mud guard and secured within the brackets 33 which are thus clamped upon the bottom face of the mud guard. The adjustable connections between the brackets and the upturned ends 18 of the bottom plate 17 permit the parts to be so adjusted as to support the upper end of the tubular bearing member 27 within the opening provided therefor in the mud guard at 38 and in the opening in the attaching strip 28, as shown in Fig. 2. After the bearing 27 and the stem 26 have been inserted upwardly through the mud guard and the strip 28, the yoke 29 is attached to the stem 26.

It is to be understood that mechanism such as herein described is to be combined with each of the knuckles on the front axle of an automobile. Thus when the front wheels are turned to the right or to the left motion will be transmitted through the stem 6 and the lazy tongs to the wheels 22 and thence through the band 24 to the smaller wheels 25. This will cause the yokes 29 to swing in the same direction as the front wheels but at a slightly greater speed so that when the vehicle is making a turn the light rays will always be directed in advance of the path in which the car is moving, thus insuring the illumination of the road in the direction in which the car is turning. The lazy tongs connection permits relative movement of the vehicle body and the axle and the finger 7 on the stem 6 brings the longitudinal axis of the lazy tongs and its arm 9 in line with the axis of rotation of the knuckle member 1.

A device such as herein described can be quickly and securely attached without requiring the services of a skilled mechanic.

What is claimed is:—

1. A dirigible headlight attachment for automobiles, including a support engaging structure, a lamp carrying member mounted for rotation relative thereto, a stem mounted for rotation within said structure, speed multiplying means for transmitting motion from the stem to the lamp supporting member, a lazy tongs connected to the stem, and means for attaching the lazy tongs to the steering knuckle of the vehicle.

2. A dirigible headlight attachment for automobiles, including a support engaging structure, a lamp carrying member mounted for rotation relative thereto, a stem mounted for rotation within said structure, speed multiplying means for transmitting motion from the stem to the lamp supporting member, a lazy tongs connected to the stem, and means for holding the longitudinal axis of the lazy tongs substantially in line with the axis of movement of a steering knuckle of the vehicle, and for connecting said lazy tongs to the steering knuckle.

3. The combination with a stem for attachment to the movable member of a steering knuckle, said stem having a portion intersecting the axis of rotation of said member, of a lazy tongs, a connection between said lazy tongs and the stem, a second stem connected to and revoluble with the lazy tongs, a support for said second stem, means for attaching the support to a portion of a vehicle body, a lamp supporting member, speed multiplying means for transmitting motion from said second stem to the lamp supporting member.

4. The combination with the movable member of a steering knuckle, of a stem secured thereto and revoluble therewith, said stem having a portion intersecting the axis of rotation of said member, a lazy tongs, means for connecting one end of the lazy tongs to the stem, a mud guard, a structure secured to and supported under the mud guard, stems mounted for rotation within said structure, a lamp supporting yoke carried by one of the stems, a pivotal connection between the other stem and the upper end of the lazy tongs, and speed multiplying means for transmitting motion from the upper stem of the lazy tongs to the stem of the lamp supporting yoke.

In testimony that I claim the foregoing as my own, I have hereto affixed my signature in the presence of two witnesses:

ELMER E. KRUMBEIN.

Witnesses:
JOHN J. SALLADE,
LEE M. SALLADE.